United States Patent [19]

Shin

[11] Patent Number: 5,140,410

[45] Date of Patent: Aug. 18, 1992

[54] CHROMINANCE SIGNAL MIXING CIRCUIT IN A MOTION ADAPTIVE TYPE SIGNAL SEPARATOR

[75] Inventor: Youn-bok Shin, Suwon, Rep. of Korea

[73] Assignee: SamSung Electronics Co., Ltd., Suweon, Rep. of Korea

[21] Appl. No.: 641,276

[22] Filed: Jan. 15, 1991

[30] Foreign Application Priority Data

May 23, 1990 [KR] Rep. of Korea ............... 90-7472

[51] Int. Cl.$^5$ .................. H04N 9/64; H04N 9/77
[52] U.S. Cl. ............................... 358/31; 358/40
[58] Field of Search ............................ 358/31, 40

[56] References Cited

U.S. PATENT DOCUMENTS

| | | | |
|---|---|---|---|
| 4,703,341 | 10/1987 | Willis | 358/31 |
| 4,853,765 | 8/1989 | Katsumata et al. | 358/31 |
| 4,870,482 | 9/1989 | Yasuki et al. | 358/31 |
| 4,982,271 | 1/1991 | Sugiyama et al. | 358/31 |
| 4,994,900 | 2/1991 | Ebara et al. | 358/31 |

FOREIGN PATENT DOCUMENTS

0241854 10/1987 European Pat. Off. .
55-123280 9/1980 Japan ................. 358/31
60-57788 4/1985 Japan ................. 358/31
60-57789 4/1985 Japan ................. 358/31
60-57795 4/1985 Japan ................. 358/31
63-224494 3/1987 Japan ................. 358/31

Primary Examiner—David K. Moore
Assistant Examiner—Wendy R. Greening
Attorney, Agent, or Firm—Robert E. Bushnell

[57] ABSTRACT

A motion adaptive type chrominance mixing circuit applied to the Y/C separator in a color video signal processing system is disclosed for outputting the mixed chrominance signal according to the motion coefficient of a picture. A chrominance mixing circuit includes a chrominance mixing portion, a band pass filter, and a multiplexer. The chrominance mixing portion includes a first adder, a second adder and a multiplier. The band pass filter receives the frame combed signal, removes the error component included in the frame combed chrominance signal and outputs the result to the multiplexer. The multiplexer receives the frame combed signal passing through the band pass filter and the frame combed signal by-passing the band pass filter, selects one of them in accordance with the motion coefficient and supplied to the chrominance mixing portion.

12 Claims, 5 Drawing Sheets

CHROMINANCE SIGNAL MIXING CIRCUIT IN A MOTION ADAPTIVE TYPE SIGNAL SEPARATOR

BACKGROUND OF THE INVENTION

This invention relates to a motion adaptive type chrominance signal mixing circuit for detecting a luminance signal by mixing color signals which are obtained through a band pass filter, 2H comb filter or line comb filter, and frame comb filter in accordance with a motion amount of a video signal, and subtracting the mixed color signals from an original composite video signal, so as to separate the luminance signal from the composite video signal in a color video signal processing system. And more particularly, the present invention relates to a color signal mixing circuit and a method thereof for improving the picture quality effected by removing an element resulting in image quality degradation included in a color signal component processed by a frame comb filter when the mixing of the motion adaptive type color signal is performed with a semi-motion picture in a motion adaptive type color signal mixing circuit.

In a conventional luminance/chrominance signal separator within a video signal processor, a motion adaptive type chroma mixing circuit for detecting a luminance signal detects and counts the motion data of a picture, and classifies them into a motion picture, a semi-motion picture and a still picture. Then, the chroma mixing circuit outputs a chroma signal processed by a line comb filter in case of the motion picture, while it outputs a chroma signal processed by a frame comb filter in case of the still picture. Also, the chroma mixing circuit outputs a chroma signal which is obtained by mixing properly chroma signals processed by a line comb filter and a frame comb filter in accordance with a motion factor of a video signal.

Assuming that a coefficient of the motion factor with n bits is a value of K, a line comb filtered chroma signal is a value of $C_L$, a frame comb filtered chroma signal is a value of $C_F$, and a motion adaptive type mixed chroma signal is a value of $C_M$, a motion adaptive type mixing operation is represented by the following equation:

$$C_M = C_L \cdot K + C_F \cdot (1 - K)$$
$$= C_L \cdot K + C_F - C_F K$$
$$= (C_L - C_F) \cdot K + C_F$$

Figure 3:
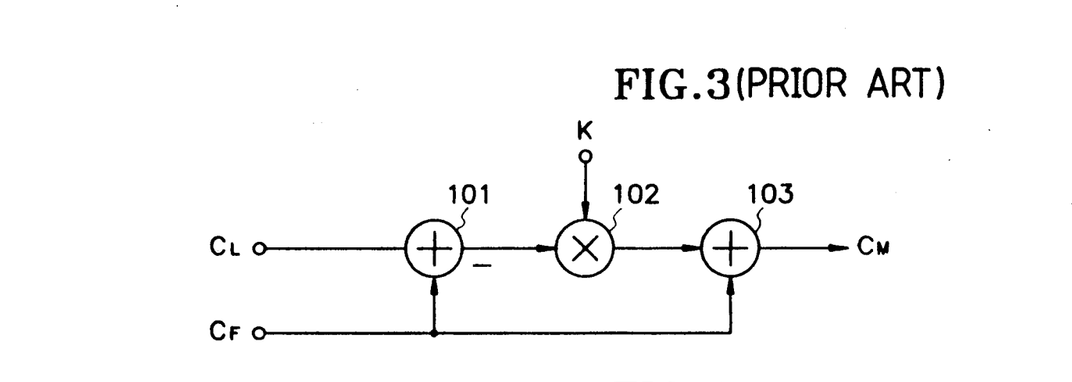
FIG. 3 is a block diagram schematically showing a conventional motion adaptive type chrominance signal mixing circuit.

Therefore, a motion adaptive type chroma mixing circuit is made up of two adder 101 and 103, and a multiplier 102 for operation of the coefficient K and the respective line and frame combed chroma signals $C_L$ and $C_F$ as shown in FIG. 3. Referring to FIG. 3, when a line combed chroma signal $C_L$ is inputted to the first adder 101, and a frame combed chroma signal $C_F$ is inverted and inputted, an output of the first adder 101 is inputted to the multiplier 102, multiplied by the coefficient K, and supplied to the second adder 103. Then, the second adder 103 adds the the out of multiplier 102 to the frame combed chroma signal $C_F$ and outputs a motion adaptive type chroma mixed signal.

Here, there may, in another prior art, be a case that a band pass filter which is not shown in FIG. 3 is connected to one terminal of the first adder 101, and therefore a frame combed chroma signal $C_F$ is filtered by the band pass filter before inputted to the first adder 101.

However, in the former motion adaptive type chroma mixing circuit as described above, an image quality is not degraded in case of a complete still picture and a complete motion picture, but an image quality is degraded due to the fact that the frame combed chroma signal includes many error components resulting from crosstalk when the frame combed chroma signal $C_F$ and the line combed chroma signal $C_L$ are mixed in case of semi-motion picture.

In addition, in the latter case with a band pass filter which is connected to one terminal of the first adder for filtering the frame combed chroma signal $C_F$, the frame combed chroma signal $C_F$ is again filtered by a band pass filter in a complete still picture.

This may result in image quality degradation. Therefore, there has been required to selectively control a band pass filter to be inserted in or removed from one terminal of the first adder in accordance with the motion data of a picture.

SUMMARY OF THE INVENTION

It is an object of the present invention to provide a chroma signal mixing circuit in a motion adaptive type signal separator for improving an image quality by filtering a frame combed signal at a predetermined band width in accordance with a motion factor in case of a semi-motion picture.

According to one aspect of the present invention, there is provided a motion adaptive type chroma mixing circuit having a first adder, a second adder and a multiplier in order to separate a luminance signal and a chrominance signal from a video signal by detecting a difference signal between lines and a difference signal between frames from the video signal and mixing the respective difference signals for obtaining a chrominance signal, comprising:

a band pass filter for filtering the frame combed chroma signal at a predetermined band width; and a multiplexer for selecting one between the output of the band pass filter and the frame combed chroma signal in accordance with the motion data of a picture and applying to the other terminal of the first adder and the second adder.

There is also provided a motion adaptive type chrominance signal mixing method comprising the steps of:

selecting a purely frame combed chrominance signal in case of a complete still picture;

filtering the frame combed chrominance signal by a band pass filter, selecting the filtered chrominance signal and mixing the selected signal with a line combed chrominance signal in case of a semi-motion picture; and selecting a line combed chrominance signal without selecting a frame combed chrominance signal and outputting the line combed signal in case of a complete motion picture.

BRIEF DESCRIPTION OF THE DRAWINGS

These and other objects and features of the present invention can be understood through the following embodiment by reference to the accompanying drawings, in which.

DETAILED DESCRIPTION OF THE PREFERRED EMBODIMENT

A video signal processing system and a luminance/chrominance separator in a general color TV broadcast system, to which an embodiment of the present invention is applied, will be described below before explaining the preferred embodiment according to the present invention.

Existing color TV broadcasting systems use a composite TV signal which is obtained by multiplexing the color subcarrier modulated by a difference signal of the luminance signal and chrominance signal. For this reason, a TV receiver must perform luminance/chrominance separation (to be referred to as Y/C separation hereinbefore).

Figure 1:
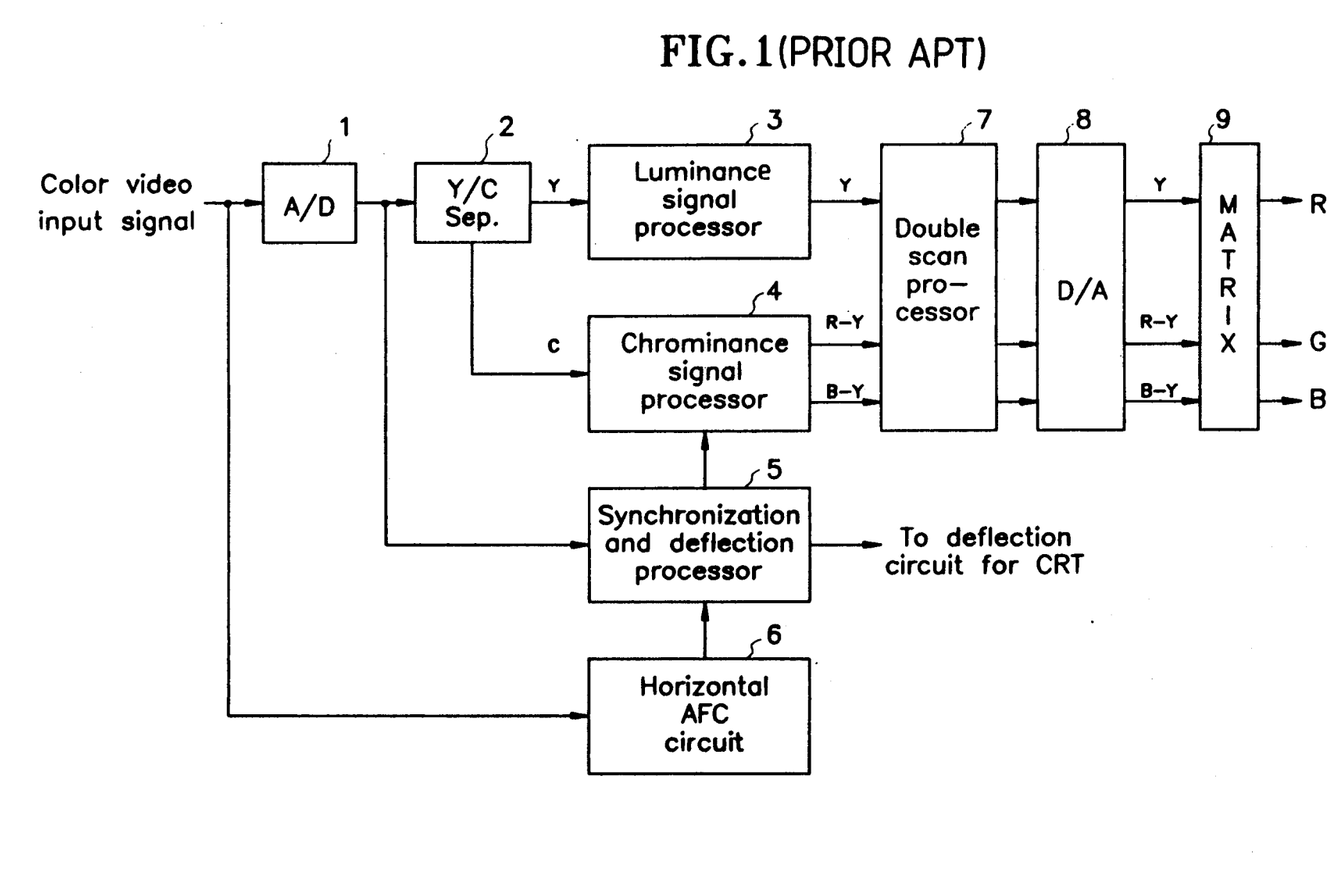
FIG. 1 is a constitutional block diagram schematically showing a general digital signal processing system in a digital TV set.

A conventional digital signal processing system in a digital TV set is constituted as shown in FIG. 1, and a process of a color video signal will be described below with reference to FIG. 1.

As shown in FIG. 1, an analog video signal supplied to input terminal is converted into a digital video signal by A/D converter 1. Y/C separator 2 separates this digital signal into the Y (luminance signal) component and the C (chrominance signal) component. This Y/C separator 2 aims at obtaining the Y and C signals free from cross-color interference, which is caused when the luminance signal is mixed in the chrominance signals. The output Y signal from Y/C separator 2 is processed by luminance signal processor 3. The C signal outputted from Y/C separator 2 is processed by chrominance signal processor 4. Y/C separator 2, luminance signal processor 3, and chrominance signal processor 4 are formed into an IC as color demodulation video signal processing circuit.

The digital video signal from A/D converter 1 is also supplied to synchronization and deflection processor 5, so as to control the color demodulation processing circuit in synchronism with a phase of clock 3 fsc. In addition, in order to function as a CRT deflection circuit, the synchronization and deflection processor 5 includes a vertical synchronization circuit for obtaining a vertical sync deflection signal from the digital video signal, and a horizontal synchronization circuit for obtaining a horizontal drive pulse on the basis of an output from horizontal AFC circuit 6.

In order to obtain high image quality, luminance signal Y from the luminance signal processor 3, and color difference signals R-Y and B-Y from the chrominance signal processor 4 are supplied to double scan processing circuit 7. As is well known, double scan processing circuit 7 doubles the scanning lines in an image to improve a vertical resolution and minimize unsteady flickering. After the scan processing for high image quality is performed signals Y, R-Y and B-Y are respectively converted by D/A converter 8 into analog signals and then converted by matrix circuit 9 into the R, G and B signals. However, if signal separation in the Y/C separator 2 is performed in a simple manner, this may result in image quality degradation such as cross-color or dot crawl, resulting from incomplete signal separation. Recently, a comb filter having excellent separation characteristics has been introduced for the purpose of improved Y/C separation. However, even when such a comb filter is used, there is no noticeable improvement in image resolution in a helical direction.

With the aim of eliminating the above drawbacks, a so-called motion adaptive type Y/C separator has recently been developed for use in a digital TV system in which signal processing is performed digitally upon detection of a video signal, in order to obtain an image of particularly high quality. The motion adaptive type signal separator changes the parameters of its filter characteristics by detecting the motion data of a picture. This separator performs Y/C separation with respect to both a still picture and a motion picture on the basis of operations between frames, using a frame memory, and on the basis of operations between lines, using a line memory, respectively. Such a motion adaptive type signal separator will be described below with reference to FIG. 2.

Figure 2:
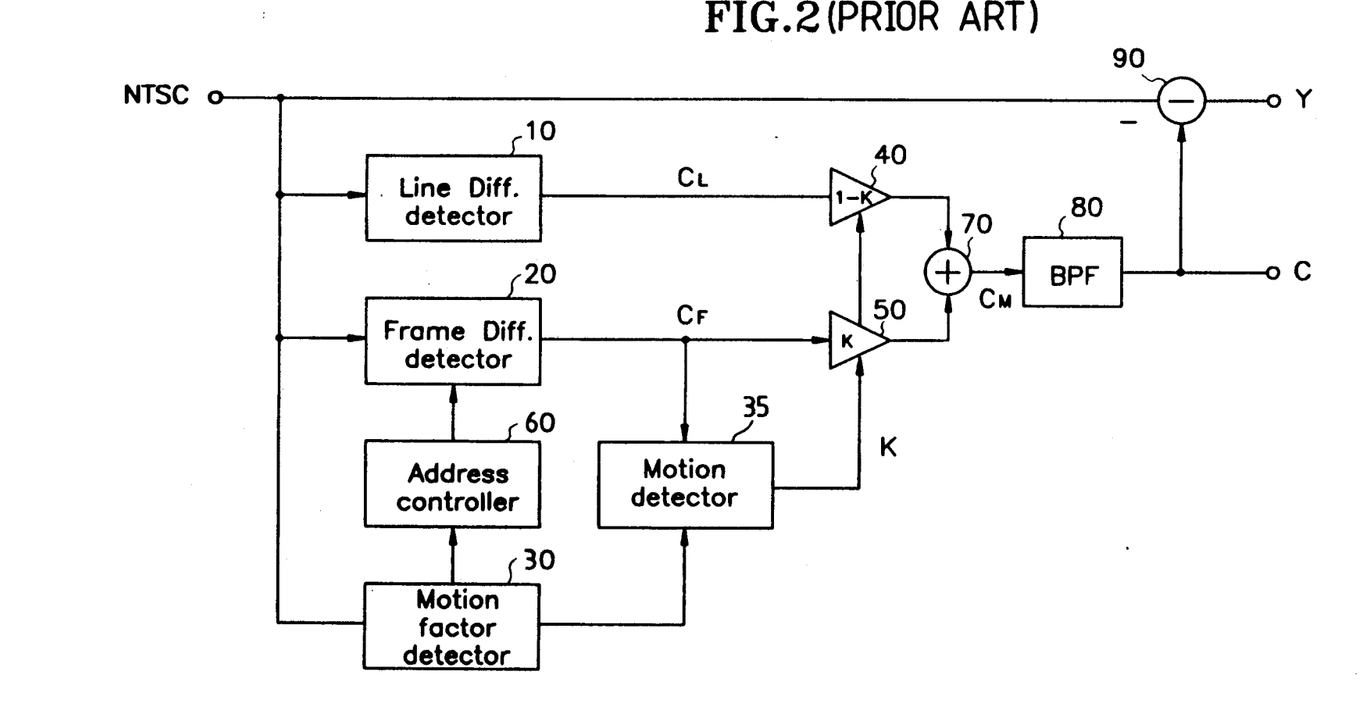
FIG. 2 is a circuit diagram of a conventional motion adaptive type signal separator to which the present invention is applied.

Referring to FIG. 2, an NTSC signal is inputted to line difference detector 10, frame difference detector 20, and motion factor detector 30. The line difference detector 10 obtains a proper difference signal $C_L$ when reproducing the motion picture, and inputs it to a gain controller 40. The frame difference detector 20 obtains a proper differences signal $C_F$ when reproducing the still picture, and inputs it to another gain controller 50. At this time, the signal detecting in the frame difference detector 20 is influenced by the motion factor detector 30 and the address controller 60.

That is, the motion factor detector 30 detects a motion factor from the previous frame to the present frame with respect to a component of the motion picture. The detected motion factor is supplied to the address controller 60, in which an address control signal is generated in accordance with the motion factor. The frame difference detector 20 outputs the signal $C_F$ which is corrected by the address control signal in order that the position of the previous frame in the motion picture may be equal to the position of the present frame in the motion picture.

Therefore, even in a component of the motion picture, the signal of the previous frame overlapping in the signal of the present frame is outputted, so that a judgment of the still picture is enlarged and a mixing ratio of the frame difference signals is increased. The detected signal outputted from the motion factor detector 30 is inputted to a motion detector 35, so that it separates a chrominance signal by the line difference signal. At this time, a motion coefficient K becomes '0' compulsively when a color sub-carrier is not moved to an inverse position. The signals outputted from the gain controller 40 and 50 are mixed in an adder 70.

The mixed signal in the adder 70 is supplied to a band pass filter 80 which outputs a color signal C after limiting the bandwidth of the mixed signal in a horizontal direction. The luminance signal Y is also obtained by subtracting the chrominance signal C from the NTSC signal in a subtracter 90.

Hitherto, a general video signal processing system and a Y/C separator to which the present invention is applied are described above, and then an embodiment according to the present invention will be described below with reference to FIG. 4 and FIG. 5.

Figure 4:
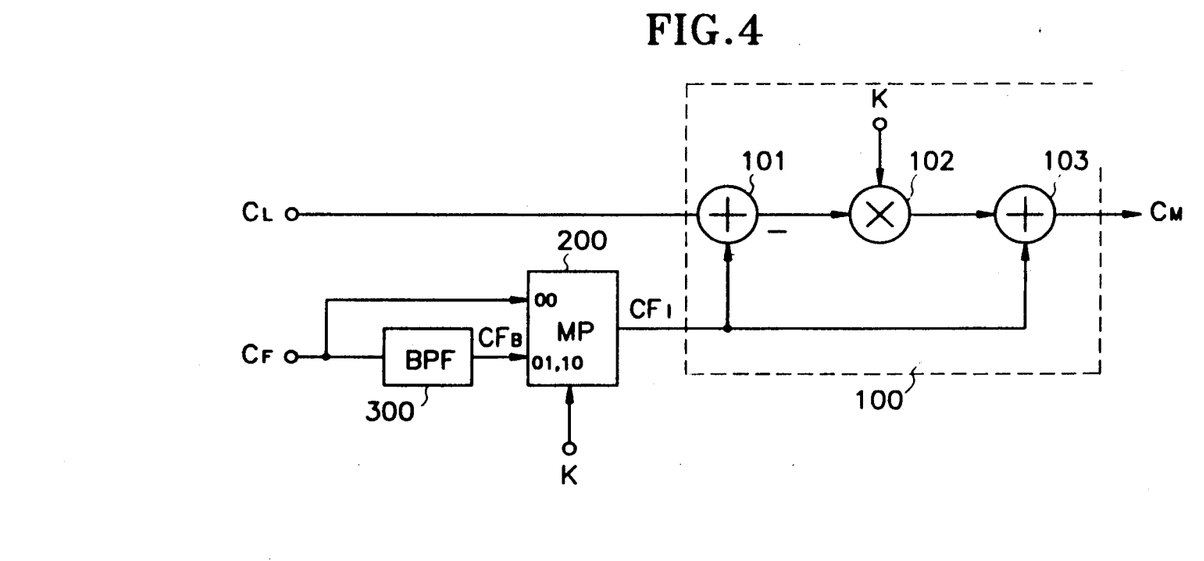
FIG. 4 is a block diagram schematically showing a motion adaptive type chrominance signal mixing circuit according to the present invention.

Referring to FIG. 4, a motion adaptive type chroma mixing circuit according to the present invention, comprising a well-known motion adaptive type mixing portion 100 having a first adder 101 in which a line combed chrominance signal $C_L$ is input to one terminal thereof, a second adder 103 and a multiplier 103 as shown in FIG. 3; a band pass filter 300 for filtering a frame combed chrominance signal $C_F$ at a predetermined bandwidth; and a multiplexer 200 for selecting one between the output $C_{FB}$ of the band pass filter 300 and the frame combed signal $C_F$ in accordance with the motion data K of a picture and applying to the other terminal of the first adder 101 and the second adder 103 in the motion adaptive type mixing portion 100.

Figure 5A:
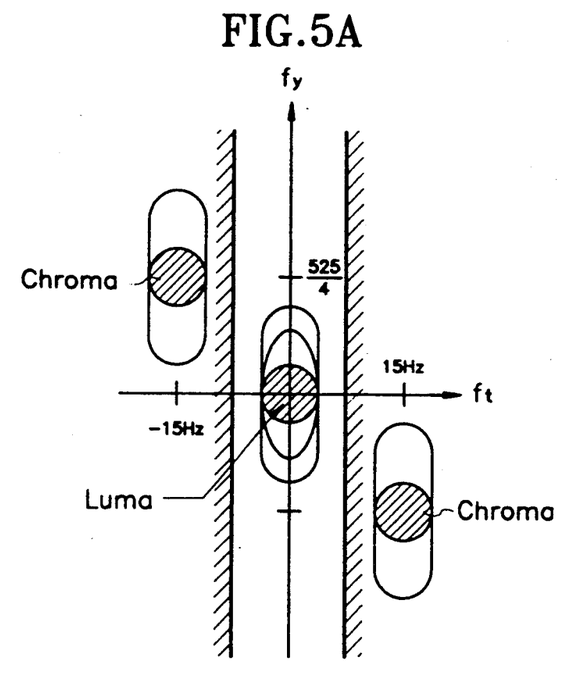
FIGS. 5A to 5C are graphs of spectrum distribution in accordance with the motion data of a video signal, respectively.
Figure 5B:
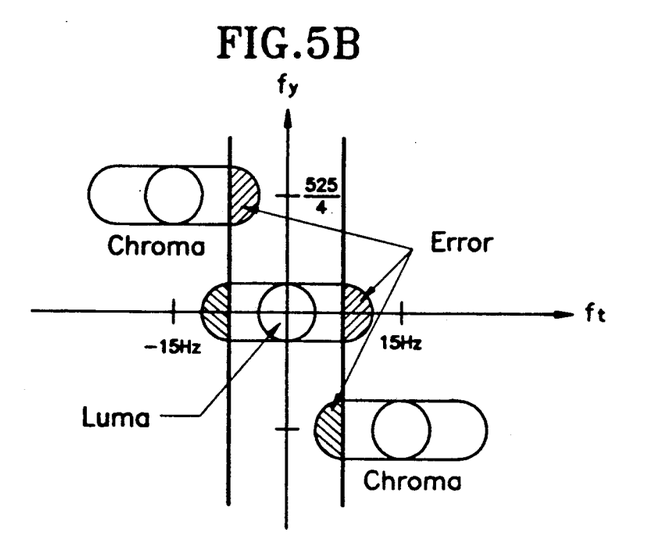
Figure 5C:
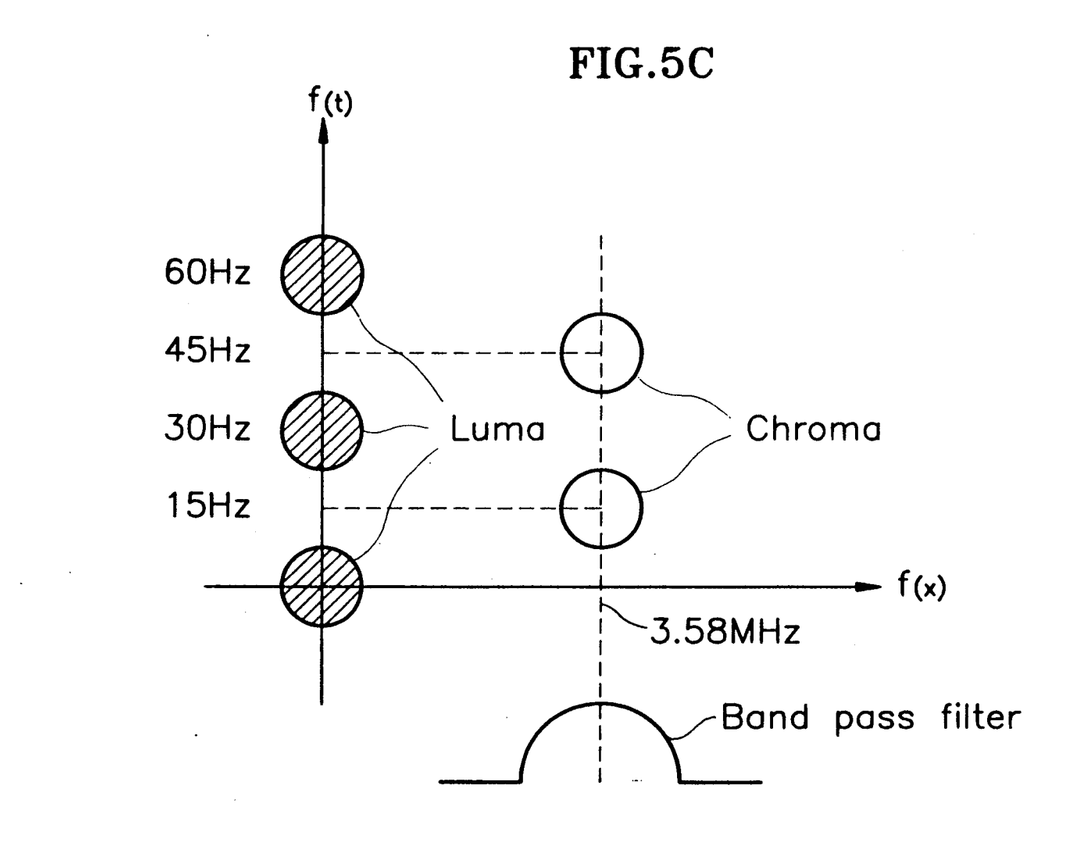

FIG. 5A to 5C show graphs of spectrum distribution according to the present invention, and more specifically FIG. 5A represents a graph of temporal frequency spectrum in a still picture, FIG. 5B represents a graph of temporal frequency spectrum in a motion or a semi-motion picture, and FIG. 5C represents a graph of chrominance/luminance spectrum viewed in the plane of a horizontal time axis.

The operation of the present invention according to the above-described composition will be described below in detail.

First, a motion coefficient K is '00' when the picture is a complete still picture. In this case, a multiplexer 200 selects the frame combed chrominance signal $C_F$ between both the input signals $C_F$ and $C_{FB}$ and supplies it to the other terminal of the first adder 10 in the motion adaptive type chroma mixing portion 100. At the same time, as the motion coefficient K input to the multiplier 102 is equal to '0', the output from the second adder 103 is equal to the output from the multiplexer 200. Therefore, the motion adaptive type mixed chrominance signal $C_M$ is the frame combed chrominance signal $C_F$.

Second, a motion coefficient K is '01' or '10' when the picture is a semi-motion picture. In this case, the multiplexer 200 selects the frame combed chrominance $C_{FB}$ passing through a band pass filter 300. Therefore, the frame combed chrominance signal $C_F$ including an error component is supplied to the band pass filter 300 having a peak value at 3.58 MHz, with a result that the error component is removed. Then, the signal $C_{FB}$ is supplied to the motion adaptive type mixing portion 100, thereby mixing the desired motion adaptive type chrominance signal $C_M$ which can prevent the degradation of image quality.

Finally, a motion coefficient K is '11' when the picture is a motion picture. The multiplexer 200 does not select any one of both the input signals $C_F$ and $C_{FB}$. Therefore, only the line combed chrominance signal $C_L$ is input to the first and the second adders 101 and 103 in the motion adaptive type chrominance signal mixing portion 100 and is multiplied by the motion coefficient K in the multiplier 102, thereby outputting the motion adaptive type chrominance mixing signal $C_M$.

In addition, referring to FIGS. 5A to 5C showing graphs of frequency spectrum distribution in a complete still picture, a complete motion picture and a semi-motion picture, a separation of the luminance and chrominance signals will be described below in detail.

As shown in FIG. 5A, a temporal frequency distribution spreads linearly and vertically in a complete still picture, and therefore the luminance and the chrominance signals are efficiently separated by the frame comb filter.

As shown in FIG. 5B, a temporal frequency spectrum is distributed along a temporal direction in a motion picture or a semi-motion picture. In this case, if the luminance and the chrominance signals are separated by the frame comb filter, a hatched portion is FIG. 5B produces an error component in the image quality. Therefore, as described above, the band pass filter 300 is used to remove a luminance component included in the chrominance component, thereby minimizing the error in the image quality. As described above, the motion detector which is used to the present invention detects the motion data of a video signal and classifies into three types of motion coefficient K such as a complete still picture, a semi-motion picture and complete motion picture. Therefore, the present invention improves the degradation of image picture in a semi-motion picture by using a multiplexer 200 which selects the frame combed signal $C_F$ in case of a complete still picture, and selects the frame combed signal $C_{FB}$ via the band pass filter 300 in case of semi-motion picture.

As shown in FIG. 5C, chrominance/luminance spectrum viewed in the plane of a horizontal time axis represents that the luminance component included in the chrominance component may be removed by the band pass filter.

As described above according to the embodiment of the present invention, there is provided a chrominance signal mixing circuit in a motion adaptive type signal separator in which the frame combed chrominance signal is divided into the cases passing through a band pass filter and by-passing a band pass filter in accordance with the motion data of picture, and a multiplexer is switched in accordance with the motion coefficient, thereby improving a image quality and realizing a high definition TV system.

What is claimed is:

1. A chrominance mixing circuit in a motion adaptive type signal separator having a first adder, a second adder and a multiplier, for separating a luminance signal and a chrominance signal from a video signal by detecting a difference signal between lines and a difference signal between frames from the video signal and mixing the respective difference signals for obtaining a chrominance signal, said mixing circuit comprising:

band pass filter means for filtering said difference signal between frames at a predetermined bandwidth; and multiplexer means for selecting between the output signal of the band pass filter and said difference signal between frames in accordance with motion data of a picture, and respectively applying the signal selected to the first adder and the second adder.

2. The chrominance mixing circuit as claimed in claim 1, wherein said multiplexer means outputs the difference signal between frames passing through a band pass filter when a motion coefficient, of the motion data input to a selective terminal of said multiplexer means, represents that the picture is a semi-motion picture, and outputs the difference signal between frames by-passing said band pass filter when said motion coefficient input to the selective terminal of the multiplexer means represents that the picture is a still picture.

3. A method for mixing a line combed chrominance signal and a frame combed chrominance signal in a motion adaptive type chrominance signal mixer in response to a detected motion value indicative of one of a still image, semi-motion image, and full motion image, comprising the steps of:

selecting a frame combed chrominance signal in response to said motion value indicative of a still picture;

filtering said frame combed chrominance signal by a band pass filter to provide a filtered frame combed chrominance signal, selecting between said frame combed chrominance signal and said filtered frame combed chrominance signal, and mixing the selected signal with a line combed chrominance signal in response to said motion value indicative of said semi-motion image; and selecting a line combed chrominance signal without selecting a frame combed chrominance signal to said mixer for outputting the line combed signal in response to said detected motion value indicative of a full motion image.

4. A chrominance mixing circuit in a motion adaptive type signal separator having a first adder, a second adder and a multiplier, for separating a luminance signal and a chrominance signal from a video signal by detecting an interline difference signal of said video signal to produce a line combed chrominance signal and an interframe difference signal of said video signal to produce a frame combed chrominance signal from the video signal, and mixing the respective difference signals in response to detected motion data of the video signal for obtaining a chrominance signal, comprising:

band pass filter means for providing a filtered frame combed chrominance signal by filtering the frame combed chrominance signal at a predetermined bandwidth; and multiplexer means for selecting said filtered frame combed chrominance signal and said frame combed chrominance signal in accordance with the detected motion data of the video signal, and respectively applying the selected signal to the first adder and the second adder.

5. The chrominance mixing circuit as claimed in claim 4, wherein said multiplexer means outputs the filtered frame combed chrominance signal when the detected motion data input to a selective terminal of said multiplexer means represents a semi-motion picture, or outputs the frame combed chrominance signal when said detected motion data represents a still picture.

6. A method for mixing a line combed chrominance signal and a frame combed chrominance signal in a motion adaptive type chrominance signal mixer in response to a detected motion value indicative of one of a still image, semi-motion image, and full motion image, comprising the steps of:

selecting a frame combed chrominance signal in response to said detected motion value indicative of a still image along with a line combed chrominance signal to said mixer to produce a motion adaptive chrominance signal;

filtering the frame combed chrominance signal by a band pass filter to provide a filtered frame combed chrominance signal, selecting one of the filtered frame combed chrominance signal and the frame combed chrominance signal in response to said detected motion value indicative of a semi-motion image and mixing the selected signal with the line combed chrominance signal in accordance with said motion value; and selecting the line combed chrominance signal without selecting the frame combed chrominance signal to said mixer for outputting the line combed signal in response to said detected motion value indicative of a full motion image.

7. A chrominance mixing apparatus for a motion adaptive luminance and chrominance separator in a video signal processor, for producing a motion adaptive chrominance signal, comprising:

means for receiving a line combed chrominance signal and a frame combed chrominance signal from a video signal;

means for receiving a motion value indicative of motion in a video image;

mixer means for mixing the line combed chrominance signal and the frame combed chrominance signal according to said motion value, wherein said mixer means comprises a first and second adder for adding said line combed chrominance signal and said frame combed chrominance signal, and a multiplier coupled to receive the output of said first adder and said motion value for generating a multiplied signal to input to said second adder for producing a motion adaptive chrominance signal;

filter means for band-pass filtering the frame combed chrominance signal; and means for enabling transmission of one of the output of said filter means and the frame combed chrominance signal for inputting to said first and second adders of said mixer in response to said motion value.

8. The chrominance apparatus as claimed in claim 7, wherein said motion value indicates one of a still image, a semi-motion image, and a full motion image.

9. The chrominance apparatus as claimed in claim 8, wherein said selecting means is a multiplexer for outputting the filtered frame combed chrominance signal in response to said motion value indicative of said semi-motion image.

10. The chrominance apparatus as claimed in claim 8, wherein said selecting means is a multiplexer for outputting the frame combed chrominance signal in response to said motion value indicative of said still image.

11. The chrominance apparatus as claimed in claim 8, wherein said selecting means is a multiplexer for outputting the frame combed chrominance signal in response to said motion value indicative of said still image, the filtered frame combed chrominance signal in response to said motion value indicative of said semi-motion image or outputting neither signal in response to said motion value indicative of said full motion image.

12. A method for producing a motion adaptive chrominance signal by mixing a line combed chrominance signal and a frame combed chrominance signal, comprising the steps of:

receiving the line combed chrominance signal and the frame combed chrominance signal from a video signal;

receiving a motion value indicating the occurrence of one of a still motion, semi-motion, and full motion in a video image;

band-pass filtering the frame combed chrominance signal to provide a filtered frame combed chrominance signal; and enabling transmission one of the frame combed chrominance signal in response to the received motion value indicative of a still motion and the filtered frame combed chrominance signal in response to said motion value indicative to a semi-motion, and neither the frame combed chrominance signal nor the filter frame comb chrominance signal in response to said motion value indicative of a full motion image to be mixed with the line combed chrominance signal in accordance with said motion value for producing a motion adaptive chrominance signal.

* * * * *